United States Patent
Romero

(10) Patent No.: US 7,919,163 B2
(45) Date of Patent: Apr. 5, 2011

(54) THERMAL PACKAGING SYSTEM

(76) Inventor: Benjamin Romero, Princeton, NJ (US)

(*) Notice: Subject to any disclaimer, the term of this patent is extended or adjusted under 35 U.S.C. 154(b) by 173 days.

(21) Appl. No.: 11/895,628

(22) Filed: Aug. 24, 2007

(65) Prior Publication Data

US 2008/0057574 A1 Mar. 6, 2008

Related U.S. Application Data

(63) Continuation-in-part of application No. 10/637,824, filed on Aug. 7, 2003, now Pat. No. 7,294,374.

(51) Int. Cl.
*B29D 22/00* (2006.01)
*B29D 23/00* (2006.01)
*B32B 1/08* (2006.01)

(52) U.S. Cl. ............ 428/35.7; 428/34.1; 428/36.9; 428/36.91; 428/69; 428/72; 428/76; 220/560.13; 220/592.21; 220/4.12; 62/458; 62/457.9; 252/71; 252/73; 52/406.2; 52/406.3; 52/407.5; 126/618; 165/46

(58) Field of Classification Search ............ 428/34.1, 428/35.7, 36.9, 36.91, 26.92, 69, 72, 76; 220/560.13, 592.21, 4.12; 62/458.2, 457.9; 252/71, 73; 52/406.2, 406.3, 407.5; 126/618; 165/46
See application file for complete search history.

(56) References Cited

U.S. PATENT DOCUMENTS

| | | | |
|---|---|---|---|
| 2,467,268 A | 12/1943 | Merkle | |
| 3,480,015 A | 11/1969 | Gonzalez | |
| 4,276,752 A | 7/1981 | Modler et al. | |
| 4,931,333 A * | 6/1990 | Henry | 428/76 |
| 5,087,508 A * | 2/1992 | Beck | 428/195.1 |
| 5,647,226 A * | 7/1997 | Scaringe et al. | 62/457.2 |
| 6,044,650 A * | 4/2000 | Cook et al. | 62/130 |
| 6,209,343 B1 | 4/2001 | Owen | |
| 6,482,332 B1 | 11/2002 | Malach | |
| 6,634,417 B1 | 10/2003 | Kolowich | |
| 6,645,598 B2 * | 11/2003 | Alderman | 428/69 |

FOREIGN PATENT DOCUMENTS

| | | |
|---|---|---|
| JP | 61-72975 | 4/1986 |
| JP | 61-72975 A | 4/1986 |
| JP | 09-002829 A | 1/1997 |
| JP | 09002829 A | 7/1997 |
| JP | 2002-002829 A | 1/2002 |
| JP | 2002002829 A | 1/2009 |

OTHER PUBLICATIONS

Japanese Office Action in Japanese Application No. 2006-522722, dated Dec. 14, 2010.
Office Action for Japanese Patent Application No. 2006-522722 dated Dec. 14, 2010.

* cited by examiner

*Primary Examiner* — Michael C Miggins
(74) *Attorney, Agent, or Firm* — Nixon Peabody LLP.

(57) ABSTRACT

The present disclosure utilizes the phase change properties of various phase change materials, specifically of 1-decanol and 1-dodecanol. Blood platelets and biological tissues that are chemically unstable at high temperatures can be maintained between 20° C. and 24° C. using 1-Dodecanol in a disclosed container. Temperature sensitive pharmaceutical products may be maintained between 2° C. to 8° C. using 1-Decanol in a disclosed container. The present disclosure may be used to control the temperature of such products during transport by confining the temperature of the product within a predetermined range. This permits light weight packaging with the maintenance of temperatures in narrow, pre-selected ranges over extended periods of time. A nylon and low density polyethylene thermal blanket comprising cells substantially filled with phase change material, which is advantageously puncture proof, durable, and capable of surrounding any payload, is disclosed.

25 Claims, 8 Drawing Sheets

THERMAL PACKAGING SYSTEM

CROSS-REFERENCE TO RELATED APPLICATIONS

This application is a continuation-in-part of U.S. patent application Ser. No. 10/637,824, filed on Aug. 7, 2003 now U.S. Pat. No. 7,294,374, entitled "Thermal Packaging System," which is incorporated herein by reference.

TECHNICAL FIELD

The present disclosure relates generally to thermal packaging systems designed to store and transport items such as pharmaceuticals and biological samples.

BACKGROUND

Refrigeration, insulation, ice, and dry ice have conventionally been used to ship temperature-sensitive products, such as pharmaceuticals and biological samples. U.S. Pat. No. 3,480,015 describes an electrically operated refrigeration unit employing a chilling convective air flow to draw heat from blood collection bags deposited within an insulated compartment. U.S. Pat. No. 2,467,268 describes a method for shipping chilled elements by alternately interleaving them with dry ice packs; thermal insulating means are disposed intermediate the item to be chilled and the dry ice to prevent heat transfer by conduction and resulting overchilling. U.S. Pat. No. 4,276,752 describes a refrigerated cargo container for use in transporting temperature sensitive cargoes in aircraft.

DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DESCRIPTION OF EXAMPLE EMBODIMENTS

Figure 1A:
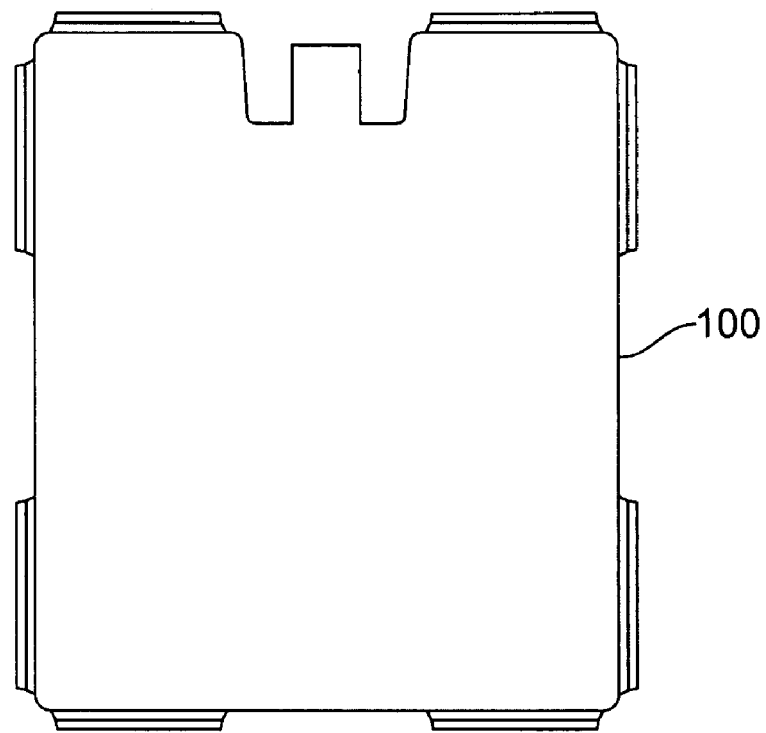
FIG. 1A is a side view of a thermal package according to one embodiment of the disclosure.

Example embodiments are described herein in the context of a system and method for thermally packaging a temperature-sensitive item. Those of ordinary skill in the art will realize that the following description is illustrative only and is not intended to be in any way limiting. Other embodiments will readily suggest themselves to such skilled persons having the benefit of this disclosure. Certain detailed aspects and embodiments of the disclosure are illustrated below, following a definition of certain terms used in the application. The same reference indicators will be used to the extent possible throughout the drawings and the following description to refer to the same or like items.

Definitions:

As used herein, "transit time" is the time a product spends in transit between a supplier's controlled environment to a customer's controlled environment. Transit time includes, for example, time spent on shipping and receiving docks.

"Phase Change Material" (or "PCM") means a material have a high heat of fusion which allows it to absorb or release large amounts of energy before melting or solidifying. Unlike conventional storage materials, when PCMs reach the temperature at which they change phase (their melting point) they absorb large amounts of heat without getting hotter. When the ambient temperature in the space around the PCM material drops, the PCM solidifies, releasing its stored latent heat.

The "Coefficient of Thermal Expansion," calculated as:

$$\beta = \frac{1}{V}\left(\frac{\partial V}{\partial T}\right)_p = -\frac{1}{\rho}\left(\frac{\partial \rho}{\partial T}\right)_p$$

(where T is temperature, V is volume, $\rho$ is density, derivatives are taken at constant pressure p; $\beta$ measures the fractional change in density as temperature increases at constant pressure), is a measurement of the energy that is stored in the intermolecular bonds between atoms that changes during heat transfer. When the stored energy increases, so does the length of the molecular bond. As a result, solids typically expand in response to heating and contract on cooling. The coefficient of thermal expansion effects cracking or shattering of containers.

"Heat of fusion," measured in kJ/kg, is the amount of energy required to melt one kg of a sample.

"Duration Index," measured in J/(cm$^3$*° C.) and calculated as: D.I.=$h_f\rho/\Delta T$, is a measurement of how long a PCM will remain at a constant temperature during the phase change.

"Enthalpy," calculated as:

$$H = U + pV,$$

where U is the internal energy, p is pressure, and V is volume, and measured in kJ/m$^3$, means the quantity of heat necessary to raise the temperature of a substance from one point to a higher temperature.

"Latent heat" is the amount of heat that a substance may absorb without an increase in temperature.

"Cycling stability" is a measurement of the number of phase changes that a material can undergo prior to an alteration of the properties of the material, such as heat of fusion.

The singular forms "a," "and," and "the" include plural referents unless the context clearly dictates otherwise.

The present disclosure provides an apparatus, method, and system that allows a user to maintain a constant known temperature over an extended period of time in a container with little to no temperature variances within the container.

Phase Change Material Research

Phase change material research for the packaging and transport of temperature sensitive materials is a complex endeavor which requires many steps involving repeated testing, research and analysis. Determining the melting onset temperature, peak melting temperature, freezing onset temperature, and peak freezing temperature is a threshold inquiry.

In order for an apparatus to be suitable for a shipping application, it must be comprised of a substance that has properties that do not change if exposed to extreme high temperatures or extreme low temperatures.

Moreover, in order to be suitable for shipping, the phase change material must have a heat of fusion rate (which relates to how long a phase change material will maintain a certain temperature) sufficient for shipping applications.

Also, the material must exhibit suitable supercooling properties, i.e., the temperature of the material must not unacceptable dip below the published freeze point. The grade of a phase change material also effects the way the phase change material reacts. Extensive (25 cycles minimum) freeze and thaw testing must be done to determine the minimum cycles of use.

Extensive materials compatibility testing and validation for a suitable container must be done.

Accelerated aging, shock and vibration, freeze and thaw tests must be conducted.

This, in and of itself, requires thorough testing using high accuracy temperature equipment, to verify that the chemical product which is to be produced in bulk is able to repeatedly phase within the application range. This is difficult because most packaging related products are perceived as "throw away" and thus need to be relatively inexpensive.

Additionally, published freeze and melt points used in published charts/literature, typically refer to the freeze/melt points of pure substances. Likewise, other published data such as the heat of fusion of the material and supercooling data is typically for pure substances. Thus this data cannot be relied on for impure PCM.

A key issue is then what is the actual heat of fusion of a PCM which is manufactured in bulk and what is its supercooling behavior is.

Yet another problem regarding published data involving melting/freezing and heat of fusion results from the test method used to obtain such data. The referenced material itself usually a pure (or very close to 100% pure). Macro effects are often ignored and the test is very susceptible to impurities and the mixing properties/homogeneity of the PCM micro sample (if it is a mixture or not highly pure).

Table 1 includes various phase change materials that have a melting point between about 5° C. and 7° C.

TABLE 1

| material or substance name | synonym | mol. formula | mol. weight | melting point (° C.) |
|---|---|---|---|---|
| 1-Chlorotetradecane | | $C_{14}H_{29}Cl$ | 232.833 | 4.9 |
| Cyanoacetylene | | $C_3HN$ | 51.047 | 5 |
| Isopropyl (2,4-dichlorophenoxy acetate | | $C_{11}H_{12}Cl_2O_3$ | 263.116 | 5 |
| Tridecylcyclopentane | | $C_{18}H_{36}$ | 252.479 | 5 |
| Hexafluorobenzene | Perfluorobenzene | $C_6F_6$ | 186.054 | 5.03 |
| Methyl dodecanoate | Methyl laurate | $C_{13}H_{26}O_2$ | 214.344 | 5.2 |
| Benzene | [6]Annulene | $C_6H_6$ | 78.112 | 5.49 |
| 3-(Trifluoromethyl)aniline | | $C_7H_6F_3N$ | 161.125 | 5.5 |
| 2-Mercaptophenol | | $C_6H_6OS$ | 126.177 | 5.5 |
| Dimethyl phthalate | | $C_{10}H_{10}O_4$ | 194.184 | 5.5 |
| 1,3-Dibromo-2-methylbenzene | 2,6-Dibromotoluene | $C_7H_6Br_2$ | 249.931 | 5.5 |
| 2-Methoxy-4-methylphenol | Creosol | $C_8H_{10}O_2$ | 138.164 | 5.5 |
| 1-Ethoxynaphthalene | | $C_{12}H_{12}O$ | 172.222 | 5.5 |
| Dibromodinitromethane | | $CBr_2N_2O_4$ | 263.830 | 5.5 |
| 5-Nonanol | Dibutylcarbinol | $C_9H_{20}O$ | 144.254 | 5.6 |
| 1,4-Dibromo-2-methylbenzene | 2,5-Dibromotoluene | $C_7H_6Br_2$ | 249.931 | 5.6 |
| 1-Bromotetradecane | | $C_{14}H_{29}Br$ | 277.284 | 5.6 |
| o-Bromophenol | | $C_6H_5BrO$ | 173.077 | 5.6 |
| 3,3-Dimethyl-2-butanol, (±) | | $C_6H_{14}O$ | 102.174 | 5.6 |
| 2-Methylheptadecane | | $C_{18}H_{38}$ | 254.495 | 5.7 |
| Nitrobenzene | | $C_6H_5NO_2$ | 123.110 | 5.7 |
| 1,4-Diiodobutane | | $C_4H_8I_2$ | 309.916 | 5.8 |
| Ethyl trans-9-octadecenoate | | $C_{20}H_{38}O_2$ | 310.515 | 5.8 |
| Tetradecane | | $C_{14}H_{30}$ | 198.388 | 5.82 |
| Isobutyl 2-hydroxybenzoate | Isobutyl salicylate | $C_{11}H_{14}O_3$ | 194.227 | 5.9 |
| Diethyl octanedioate | Diethyl suberate | $C_{12}H_{22}O_4$ | 230.301 | 5.9 |
| 3-Chloro-[1-1'-biphenyl]-2-ol | 2-Phenyl-6-chlorophenol | $C_{12}H_9ClO$ | 204.651 | 6 |
| 2,3-Dichlorotoluene | | $C_7H_6Cl_2$ | 161.028 | 6 |
| 1,3-Diphenylpropane | | $C_{15}H_{16}$ | 196.288 | 6 |
| tert-Butyl hydroperoxide | | $C_4H_{10}O_2$ | 90.121 | 6 |
| 2,2-Dimethylpropanal | Pivaldehyde | $C_5H_{10}O$ | 86.132 | 6 |
| 9-Undecen-1-ol | | $C_{11}H_{22}O$ | 170.292 | 6 |
| 2-1-Propenyl)piperidine, (±) | | $C_8H_{15}N$ | 125.212 | 6 |
| 1-Bromonaphthalene | 1-Naphthyl bromide | $C_{10}H_7Br$ | 207.067 | 6.1 |

TABLE 1-continued

| material or substance name | synonym | mol. formula | mol. weight | melting point (° C.) |
|---|---|---|---|---|
| Diiodomethane | Methylene iodide | $CH_2I_2$ | 267.836 | 6.1 |
| Parathion | | $C_{10}H_{14}NO_5PS$ | 291.262 | 6.1 |
| 2-Methoxyaniline | o-Anisidine | $C_7H_9NO$ | 123.152 | 6.2 |
| 1-Bromotridecane | | $C_{13}H_{27}Br$ | 263.257 | 6.2 |
| 1,2,3-Trimethyl-2-cyclopentene-1-carboxylic acid | Laurolenic acid | $C_9H_{14}O_2$ | 154.206 | 6.5 |
| Methyl tridecanoate | | $C_{14}H_{28}O_2$ | 228.371 | 6.5 |
| cis-9-Octadecen-1-ol | Oleyl alcohol | $C_{18}H_{36}O$ | 268.478 | 6.5 |
| 2-Oxopentanoic acid | | $C_5H_8O_3$ | 116.116 | 6.5 |
| Thieno[2,3-b] thiophene | | $C_6H_4S_2$ | 140.228 | 6.5 |
| 2-Tetradecyne | | $C_{14}H_{26}$ | 194.356 | 6.5 |
| tert-Butylacetic acid | | $C_6H_{12}O_2$ | 116.158 | 6.5 |
| 2,5-Dimethylpyrrole | | $C_6H_9N$ | 95.142 | 6.5 |
| Cyclohexane | Hexahydrobenzene | $C_6H_{12}$ | 84.159 | 6.59 |
| 1-Methyl-2-benzylbenzene | | $C_{14}H_{14}$ | 182.261 | 6.6 |
| trans-5-(1-Propenyl)-1,3-benzodioxole | | $C_{10}H_{10}O_2$ | 162.185 | 6.8 |
| 1-Decanol | Capric alcohol | $C_{10}H_{22}O$ | 158.281 | 6.9 |

This research can take a product development team in excess of two years to complete.

Glauber's salt, Soda Ash, Sodium Acetate and paraffin wax are commonly used PCMs. Although these compounds are fairly inexpensive, the packaging and processing necessary to get acceptable performance from them is complicated and costly. They are not offering a reliable pattern of releasing heat as the chemicals in these PCMs separate and stratify when in their liquid state. These PCMs have not always re-solidified properly. When temperatures dropped, they did not completely solidify, reducing their capacity to store latent heat. Many salt hydrate PCMs have the disadvantage that as they begin to freeze the pure in the solution freezes first, effecting the salt to water concentration of the remaining solution, resulting in a latent heat that is over a wide range of temperatures.

As an example of a failed products, for the same application temperature range of 2-8° C. for which the 1-dodecanol met the above requirements, several other chemicals which during preliminary referencing appeared to be candidates for the application, later did not meet some of the requirements. An example of study of linear paraffins from several manufacturers, showed that the material was able to consistently freeze at 5° C., with good heat of fusion, however during melting, the performance between batches was inconsistent and did not allow for us to accept the material as a candidate. The material could start melting at 9° C. and finish melting around 12° C., which did not meet the 2-8° C. criteria.

Phase Change Material

The present disclosure utilizes the phase change properties of various phase change materials, specifically of 1-decanol and 1-dodecanol. Blood platelets and biological tissues that are chemically unstable at high temperatures can be maintained between 20° C. and 24° C. using 1-Dodecanol in a disclosed container. Temperature sensitive pharmaceutical products may be maintained between 2° C. to 8° C. using 1-Decanol in a disclosed container. The present disclosure may be used to control the temperature of such products during transport by confining the temperature of the product within a predetermined range. This permits light weight packaging with the maintenance of temperatures in narrow, pre-selected ranges over extended periods of time. A nylon and low density polyethylene thermal blanket comprising cells substantially filled with phase change material, which is advantageously puncture proof, durable, and capable of surrounding any payload, is disclosed.

1-Dodecanol is also known as Dodecyl alcohol, lauryl alcohol, Duodecyl alcohol, and Lauric alcohol. 1-Dodecanol is a saturated fatty alcohol having a chemical formula of:

1-Dodecanol is a colorless solid and liquid and is insoluble in water. Its phase change property at about 20° C.-24° C. allows for a user to maintain the temperature of products at a known temperature of around 20° C.-24° C. 1-Dodecanol has a low toxicity, is non-hazardous, and is relatively inexpensive. 1-Dodecanol has a latent heat of fusion of 190 J/g.

1-Decanol is also known as capric alcohol, royaltac, decanol, n-decanol, decyl alcohol, caprinic alcohol, and n-decyl alcohol. 1-Decanol is a saturated fatty alcohol having a chemical formula of:

1-Decanol has a phase change at about 2° C.-8° C. that allows for a user to maintain the temperature of products at a known temperature of around 2° C.-8° C. Thus 1-Decanol may be used to protect products between 2° C. to 8° C., which is the required temperature for many pharmaceutical products. 1-Decanol has a latent heat of fusion of 190 J/g.

DETAILED DESCRIPTION

Figure 1B:
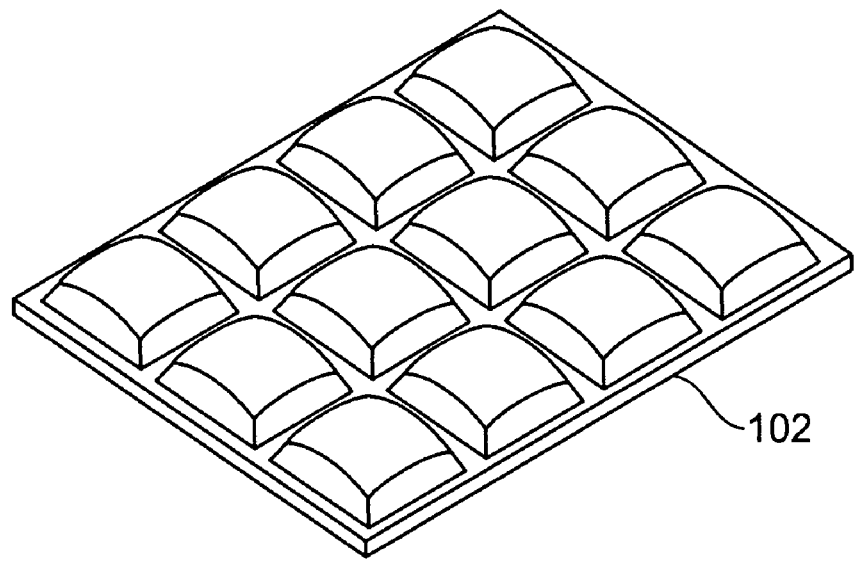
FIG. 1B is a perspective view of a thermal package according to one embodiment of the disclosure.
Figure 1C:
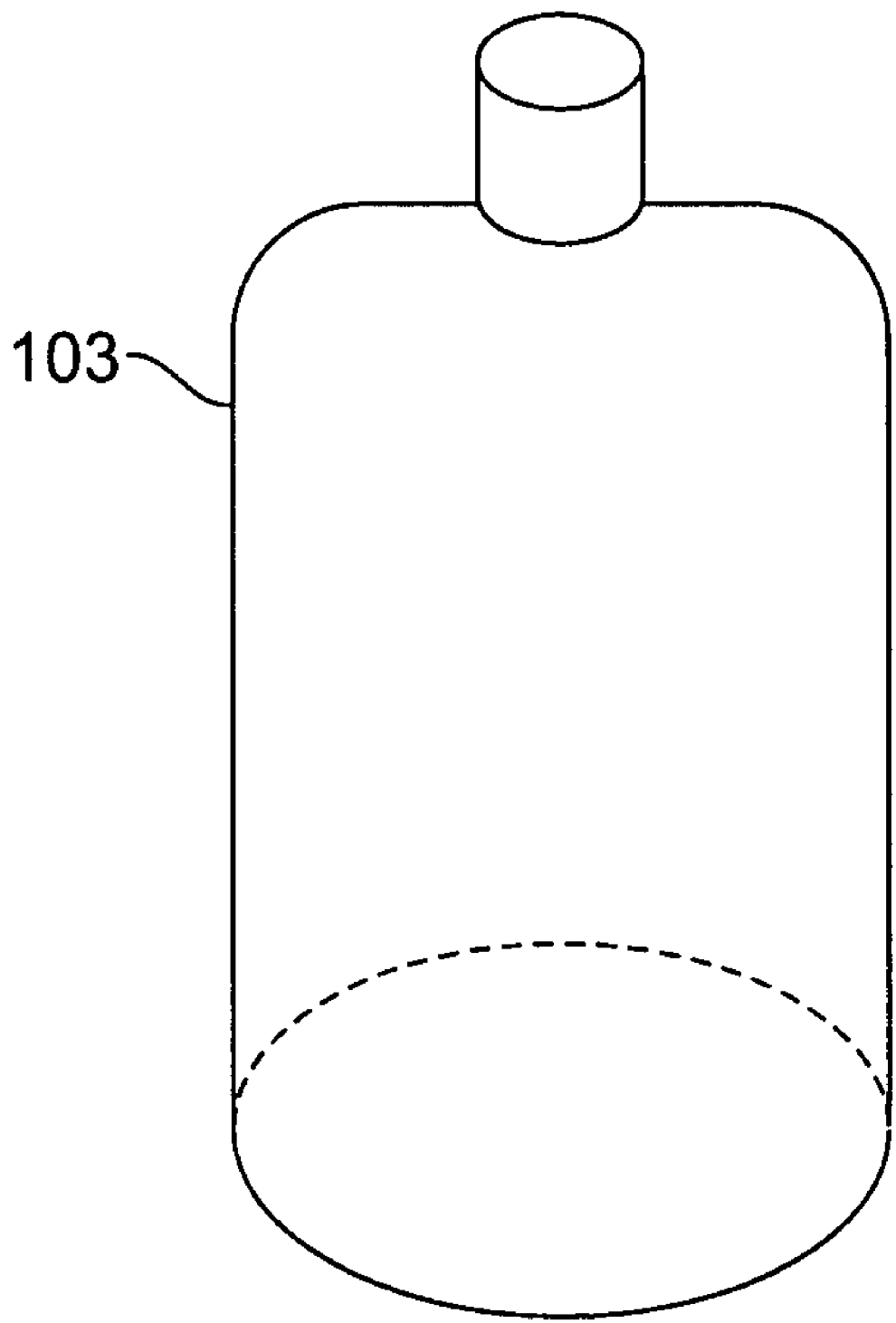
FIG. 1C is a perspective view of a thermal package according to one embodiment of the disclosure.

FIGS. 1A, 1B, and 1C illustrate various containers in which the phase change material may be packaged. The phase change material may be substantially contained in various containers or packs such as bags, shaped containers (a square container is illustrated herein) 100, gel blankets 102, bottles 103, sponges and other porous materials, recirculating systems, single and multi-wall plastic assemblies, or other similar containers. The phase change materials may be placed within the containers through an opening in the containers. The containers may be made of various materials such as high-density polyethylene, low-density polyethylene, or any other similar materials. Those of ordinary skill in the art will now realize that any materials that are chemically compatible and stable with the phase change material may be used.

The container and the phase change material may be reusable, thus allowing for a low cost packaging solution. Moreover, the thermal packaging system is low in weight and volume and allows for an equal distribution of temperature within an outer container used to house the phase change material and products.

Figures 2, 2A:
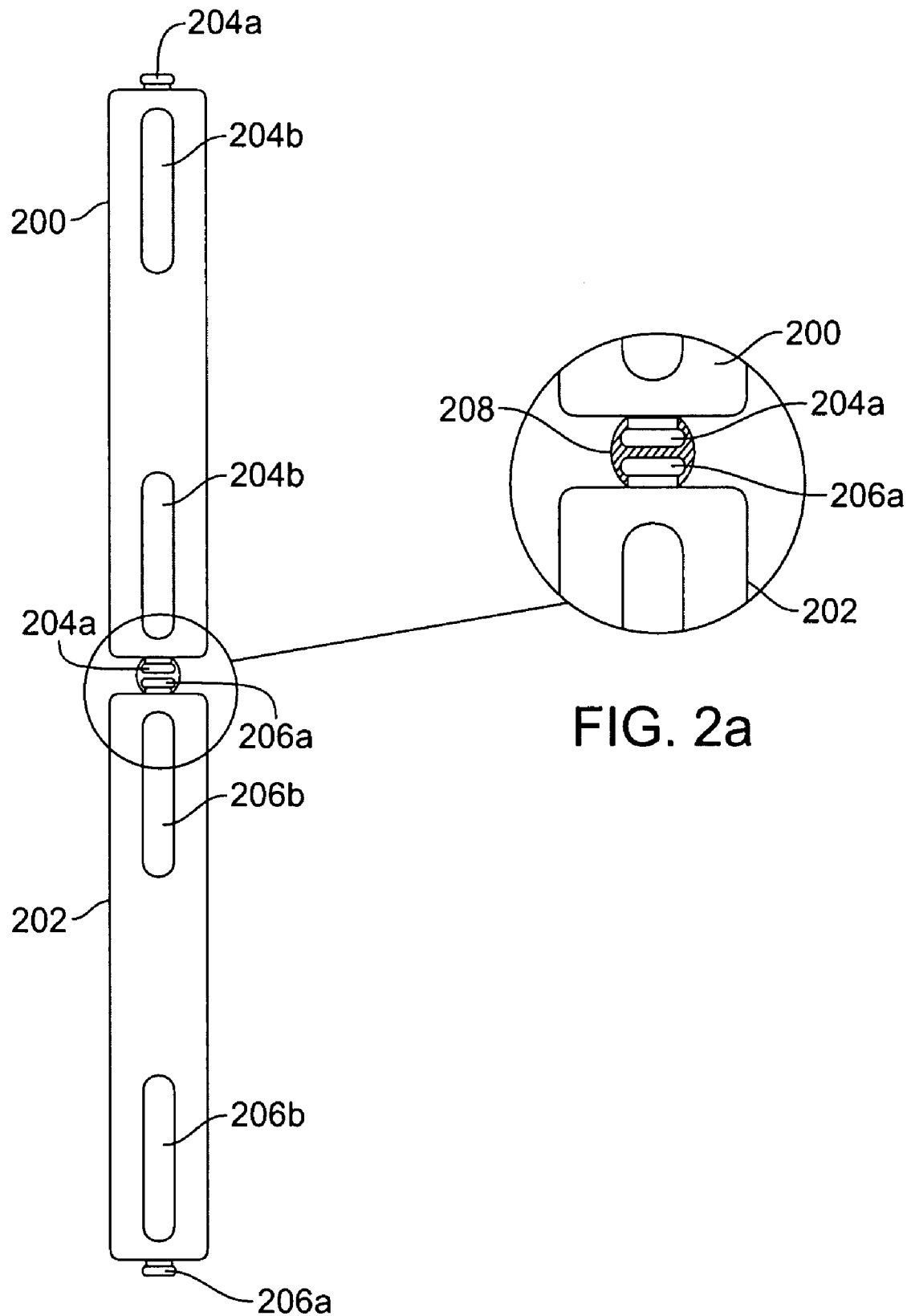
FIGS. 2 and 2a are top views of a thermal package according to one embodiment of the disclosure.

Releasable locking means on the container may protect the products from temperature variances within the packaging and may also protect the products against damage from shock and vibration during transit. FIGS. 2, 2a, 3, and 3a illustrate top views of an example to releasable lock the thermal packs together in accordance with an embodiment of the present disclosure. FIGS. 2 and 2a illustrate an example to releasably lock two containers together in a side-by-side configuration. Containers 200 and 202 may have a connector 204a, 204b, 206a, 206b on each side of containers 200 and 202. Connectors 204a and 206a may be connected using a releasable lock 208 whereby connectors 204a and 206a may slidably fit into grooves in releasable lock 208. Releasable lock 208 may have a bottom (not shown) to prevent connectors 204a and 206a from sliding out. The releasable locking means helps to thermally protect the products from temperature variances by preventing the containers from sliding, changing positions or shifting around each other. This further aid in the ability for greater validation of the products for transit.

Figures 3, 3A:
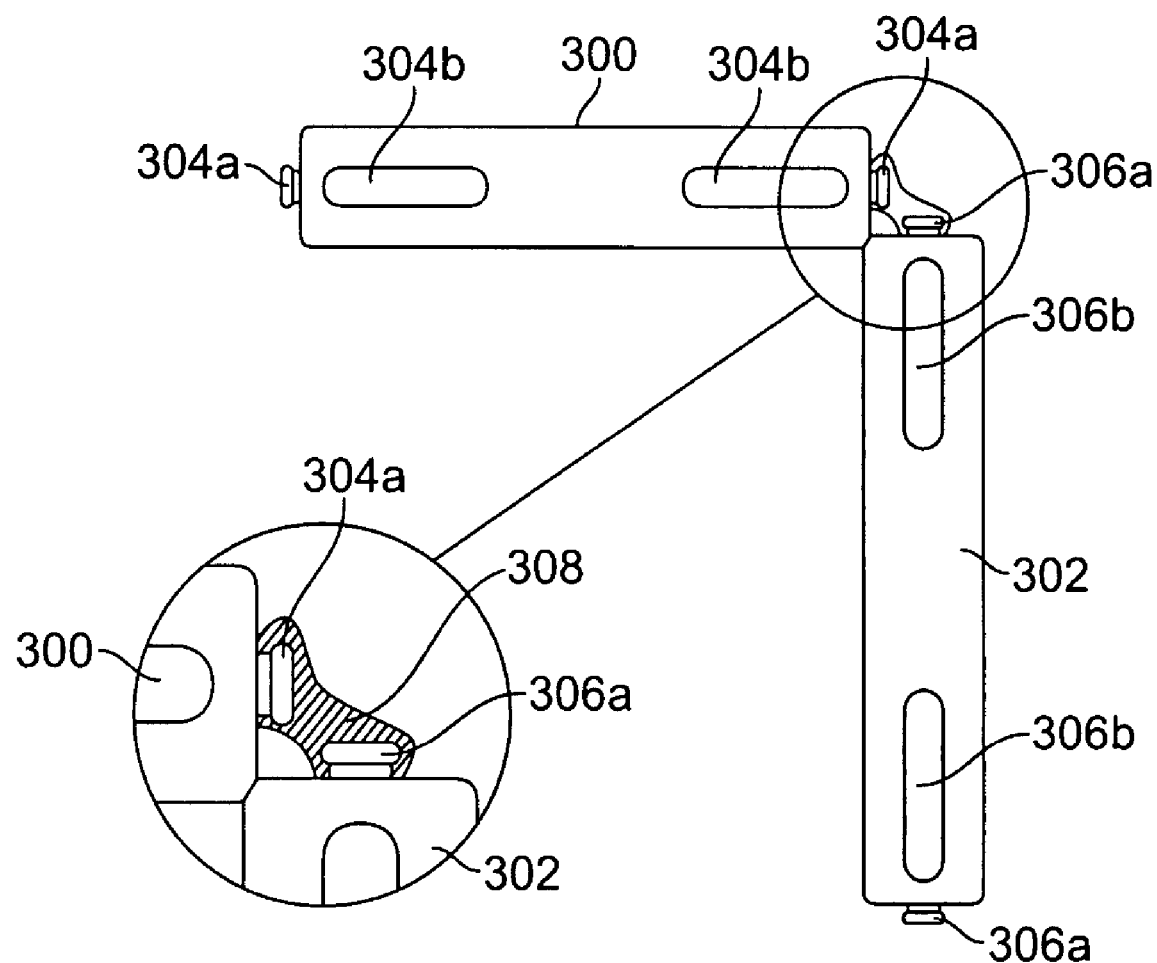
FIGS. 3 and 3a are top views of a thermal package according to one embodiment of the disclosure.

FIGS. 3, 3a, and 3b illustrate examples of releasable locks according to embodiments of the disclosure. Containers 300 and 302 may have connectors 304a, 304b, 306a, 306b on each side of containers 300 and 302. The releasable lock 308 may comprise a co-extrusion of rigid and flexible urethane. The rigid urethane may be at the ends 308a and 308b of the releasable lock 308, while the flexible urethane may be in the middle 308c of the releaseable lock 308. Similar to FIG. 2a, a releasable lock 308 may be used to connect connectors 304a and 306a whereby connectors 304a and 306a may slidably fit into the grooves in releasable lock 308. Releasable lock 308 may have a bottom (not shown) to prevent connectors 304a and 306a from sliding out. Releasable lock 308 may have a V shape that allows for containers 300 and 302 to be positioned at an angle relative to each other. The rigid urethane at the ends 308a and 308b of the releasable lock 308 may permit a firm connection between the connectors and channels. Also the flexible urethane in the middle 308c of the releaseable lock 308 may act as a hinge to permit two containers 300 and 302 to be connected together in a side-by-side configuration (similar to FIG. 2a) or to fold onto each other as depicted in FIG. 3b (a collapsed configuration).

A side-by-side configuration of the containers 300 and 302 and collapsed configuration advantageously minimizing the volume of the containers permitting them to fit into freezers and making them more suitable for shipping.

Those of ordinary skill in the art will now realize that there may be other ways to releasably lock the containers together and prevent them from easily coming apart such as the use of Velcro, snaps, and other similar releasable locking means. Moreover, the releasable locks may be positioned on any surface of a container to prevent possible movement of the containers in any direction. For example, the releasable locks may be positioned on a front and back surface of the container such that the containers may be stacked upon each other. Furthermore, FIGS. 2 and 3 illustrate two releasable locks on the containers. However, that is not intended to be limiting since any number of releasable locks may be placed on the containers as is necessary such as one or three.

In one embodiment, containers 200 and 202 are blow molded bottles with tabs that allow them to be interconnected in a variety of ways. The bottle may be ultra-sonically welded to assure a leak-proof seal. With this design, the bottle mold may not change, but various extruded connectors can be developed inexpensively to allow various connections.

Containers 200 and 202 may comprise special formulations of chemicals whose phase change temperatures are at the optimum storage temperature of the temperature-sensitive product. If the temperature-sensitive product must be maintained within 2°-8° C., containers 200 and 202 may be filled with 1-decanol. Because 1-decanol can hold 5° C. longer than a conventional phase change material (which undergoes phase change at 0° C., and has very little heat capacity at 5° C.), significantly less material is required. In addition, the phase change material can be placed in direct contact with the temperature sensitive product because there is no risk of freezing. Heat transfer from the phase change material to the product then takes place by conduction instead of convection, which is thermally more efficient. In addition, because the bottle connections are rigid, the product and phase change material maintain a consistent orientation from pack out to receipt without shifting. This reduces the size of the final package because no dunnage or air gaps are required.

In one embodiment, the PCM comprises about 90% to 100% 1-decanol.

In one embodiment, the PCM comprises about 98% to 100% 1-decanol (weight %). According to this embodiment, the PCM further comprises a maximum of 2% lauryl alcohol (weight %), a maximum of 2% 1-octanol (weight %), a maximum of 0.1% moisture, a maximum saponification value of 0.5, a maximum hydroxyl value, MG KOH/G, of up to 356, iodine value of up to 0.3, APHA color of up to 10, and acid value, MG KOH/G of up to 0.10.

In one embodiment, the PCM comprises about 98.7% 1-decanol (weight %), about 0.5% 1-octanol (weight %), about 0.09% moisture, a saponification value of about 0.17, a hydroxyl value of about 352.2 MG KOH/G, iodine value of about 0.05, APHA color of about 3, and acid value of about 0.02 MG KOH/G.

1-Decanol has a strong and unpleasant odor. In one embodiment, 1-decanol is formulated by mixing about 0.5% Berje™ 4436 mask to reduce the strong odor.

In one embodiment, the PCM comprises about 90-100% 1-dodecanol.

In certain embodiments, the PCM comprises about 98.5% to 100% 1-dodecanol (Wt %), a maximum of about 15 APHA color, maximum of about 0.10% $H_2O$ (Wt %), a maximum of about 100 ppm, and a hydroxyl number of between about 295 and 302 mg KOH/g.

In one embodiment, the PCM comprises a GC distribution of about 98.2% 1-dodecanol (normal primary) (Wt %), about 99.1% 1-dodecanol (Wt %), for a total of about 99.9% 1-dodecanol. The PCM according to this embodiment further comprises about 10 APHA color, about 0.01 $H_2O$ (Wt %), about 16 ppm carbonyl, as C=O, and a Hydroxyl Number of about 301 mg KOH/g. The Iodine Number may be about 0.2 mg $I_2$/100 mg.

In one embodiment the PCM is placed in a container that—when combined with the PCM—total one inch (25.4 millimeters).

In one embodiment, the containers are stored in an oxygen and moisture free environment to preserve shelf life.

In one embodiment, the packaging material conducts heat well; and is durable enough to withstand frequent changes in the storage material's volume as phase changes occur.

In one embodiment, the packaging material restricts the passage of water through the walls, so the materials will not dry out.

In one embodiment, the packaging material resists leakage and corrosion. In certain embodiments, aluminum, steel or polyethylene are used.

In an embodiment, the phase change material is disposable in the public waste stream.

Figure 4:
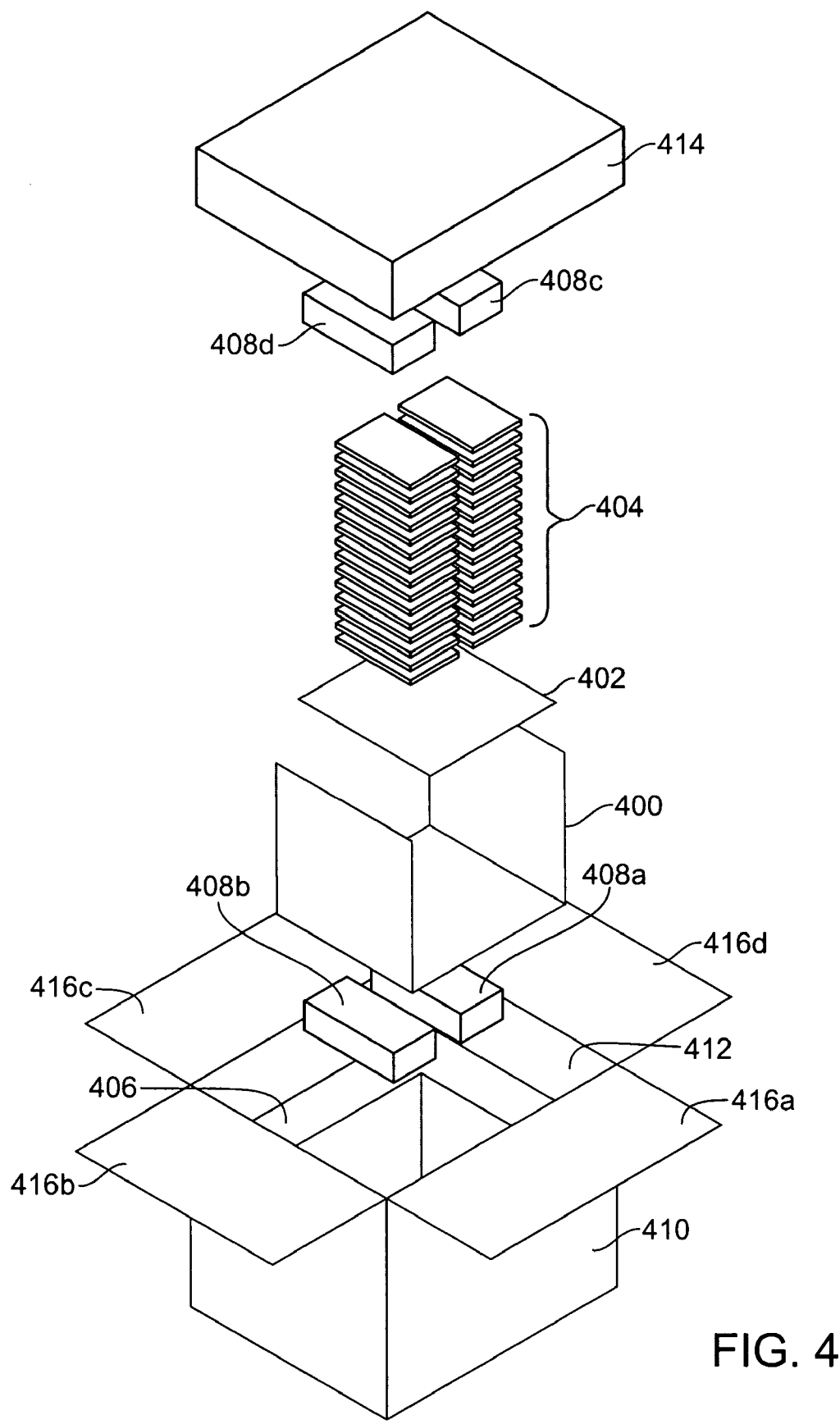
FIG. 4 is an exploded perspective view of a thermal package system according to one embodiment of the disclosure.

The present disclosure provides for a system of using the phase change material as illustrated in FIG. 4. The items 404 to be thermally protected are packaged in a first container 400. By way of example and not intended to be limiting, the items 404 may be blood platelet bags. The first container 400 may be a plastic bag, or the like. An absorbing pad 402 may be placed below the items 404 to provide for added protection from wetness or shock. The first container 400 may or may not be sealed.

A second container 406 may be used to house the first container 400. Thermal packs 408a, 408b, 408c, 408d may be positioned within the second container 406 above and below the first container 400. The thermal packs may be substantially filled with 1-Dodecanol to keep the items 404 at a constant temperature of about 20° C.-24° C. Although the thermal packs are illustrated as brick shaped containers, those of ordinary skill in the art will now realize that other shapes may be used. Moreover, as described above, the thermal packs may be connected together in the manner described above to protect the items 404 from temperature variances within the container and may protect the product from damage. A second container lid 414 may be used to seal the second container 406.

Once positioned within the second container 406, the second container 406 is then positioned in a third container 410. The third container 410 may comprise of padding or insulating material 412 around the inner periphery of the container 410. However, it will be appreciated that thermal packs may be used in addition to or instead of padding or insulating material 412. The insulating shipping materials may be made of materials such as expanded polystyrene, urethane, vacuum panels, or other similar insulation materials. The third container 410 may also have a third container lid 416a, 416b, 416c, 416d to seal the third container 410.

The first, second, and third containers, as well as the thermal packs may all be reusable thereby adding to the efficiency and low cost of the present disclosure.

Figure 5:
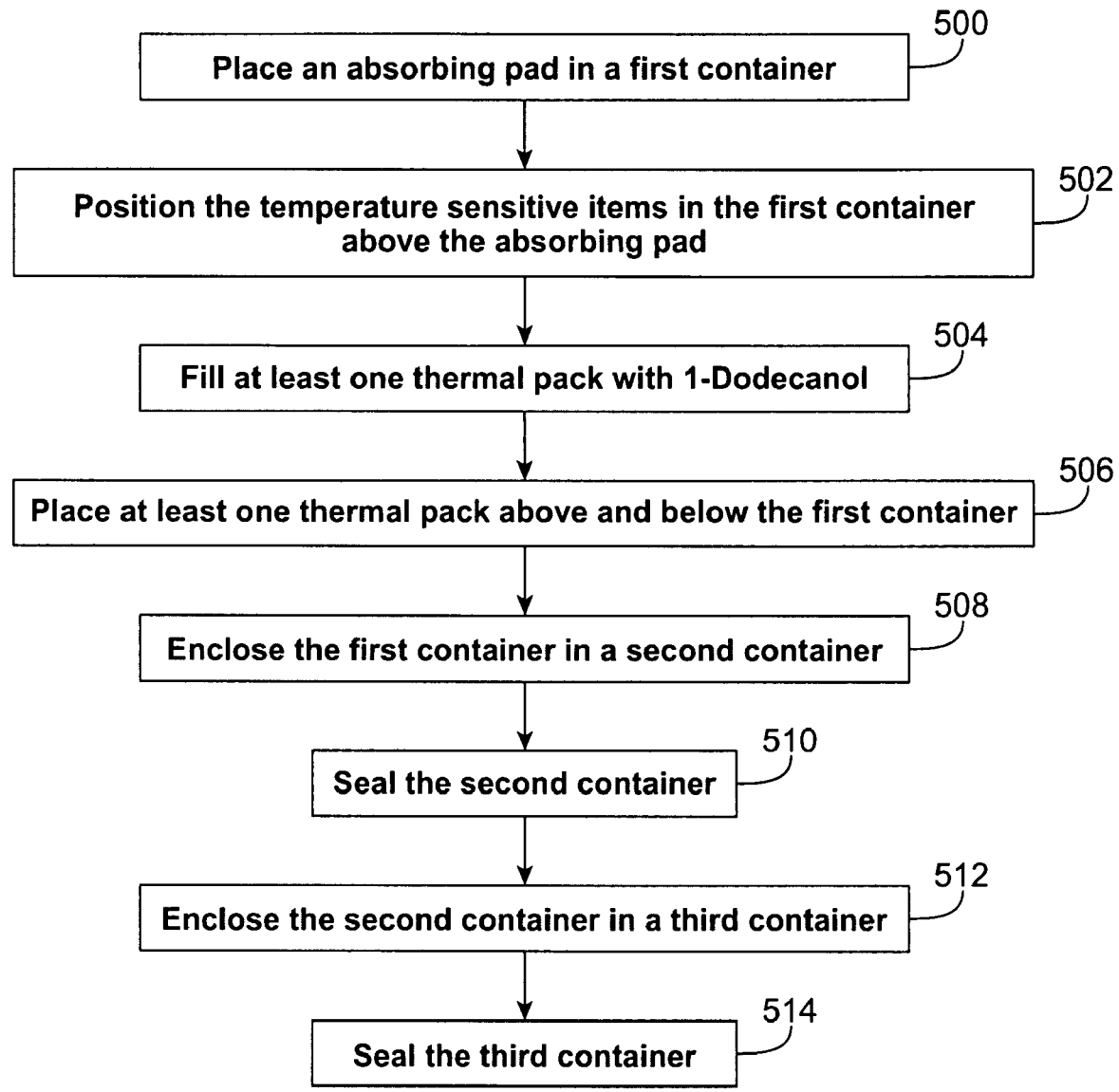
FIG. 5 is a schematic block diagram of an example embodiment of a method for thermally packaging a specimen in accordance with an embodiment of the present disclosure.

FIG. 5 is a block diagram of a method in accordance with an embodiment of the present disclosure. An absorbing pad may be placed in a first container at 500 to provide added protection from wetness or shock. The items may then be positioned in the first container above the absorbing pad at 502. However an absorbing pad does not need to be used and the first container may or may not be sealed.

At least one thermal pack may be filled with an alcohol at 504. The thermal packs may then be positioned above and below the first container at 506. The first container may then be enclosed in a second container at 508 and the second container may be sealed at 510 to maintain the temperature of the items at around 20° C.-24° C. The second container may then be enclosed in a third container at 512. The third container may contain a padding or insulating material around the inner periphery of the container. However, it will be appreciated that thermal packs may be used in addition to or instead of padding or insulating material. The third container may then be sealed at 514.

Figure 6:
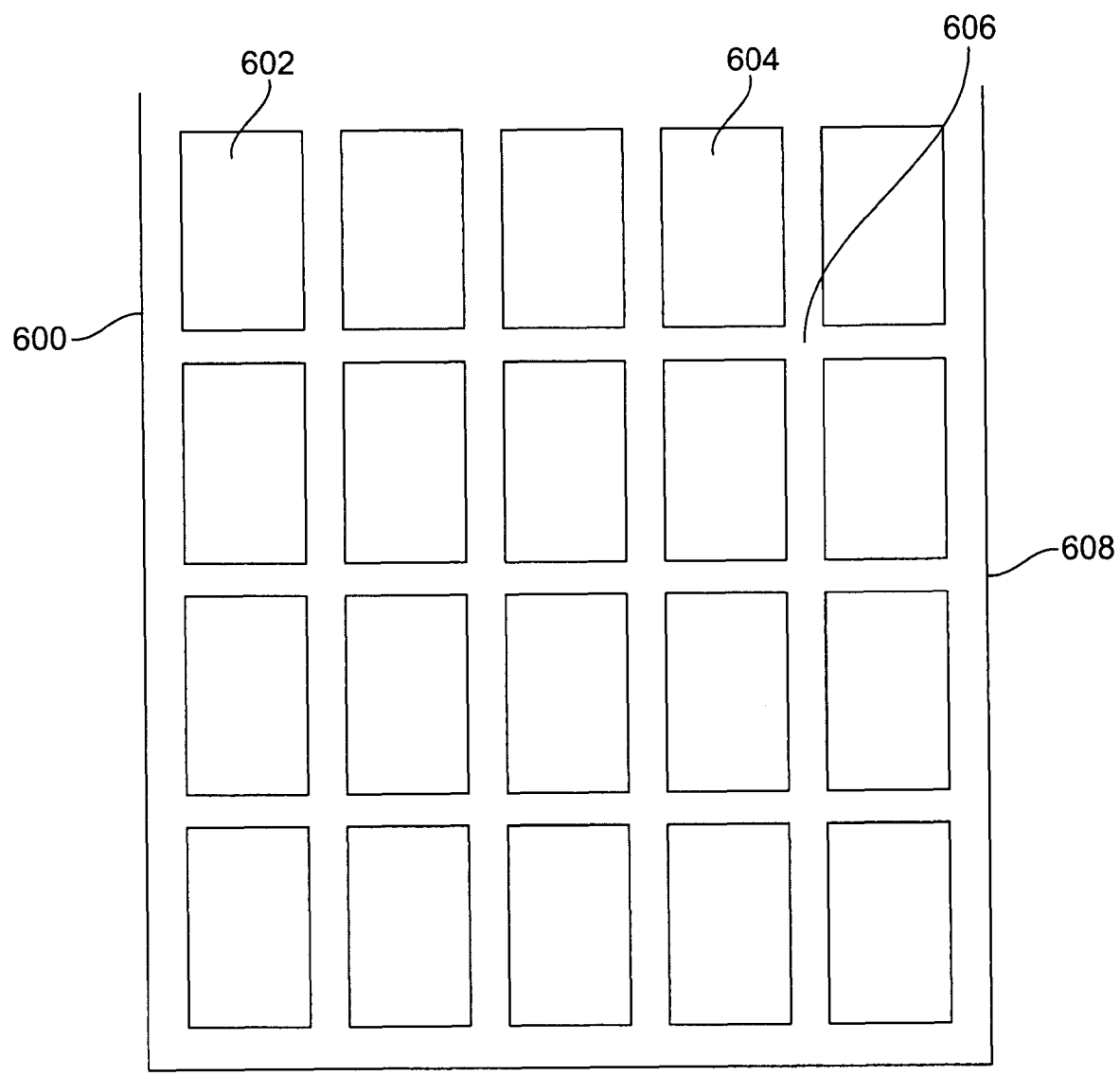
FIG. 6 is a plan view of a thermal blanket according to one embodiment of the disclosure.

Turning to FIG. 6, in one embodiment, the container is a blanket 600. The blanket 600 may comprise one or more cells 602. According to this embodiment, the cells 602 are substantially filled with a phase change material. In certain embodiments, each cell 602 has about 6 mL-0.5 L PCM. The blanket 600 may comprise nylon and polyethylene. The nylon may be extruded into the polyethylene to form a sheet. In one embodiment, the polyethylene is low density polyethylene. In one embodiment, the nylon of the blanket 600 is 1 mil thick and the low density polyethylene is 3 mil thick. Advantageously, due to this composition, the blanket 600 is substantially puncture proof and durable. The border of the blanket 604 may be heat sealed. The blanket 600 may comprise two pieces of film, each piece comprising a blend of nylon and low density polyethylene. During assembly, the cells 602 of the blanket 600 may be filled vertically and sealed along horizontal lines 606. Each cell 602 may be individually sealed so that the phase change material does not migrate among cells. The border 608 may also be heat sealed to prevent leakage of the PCM out of the blanket 600.

In one embodiment, the blanket is a pouch (comprising one cell 602).

Figure 7:
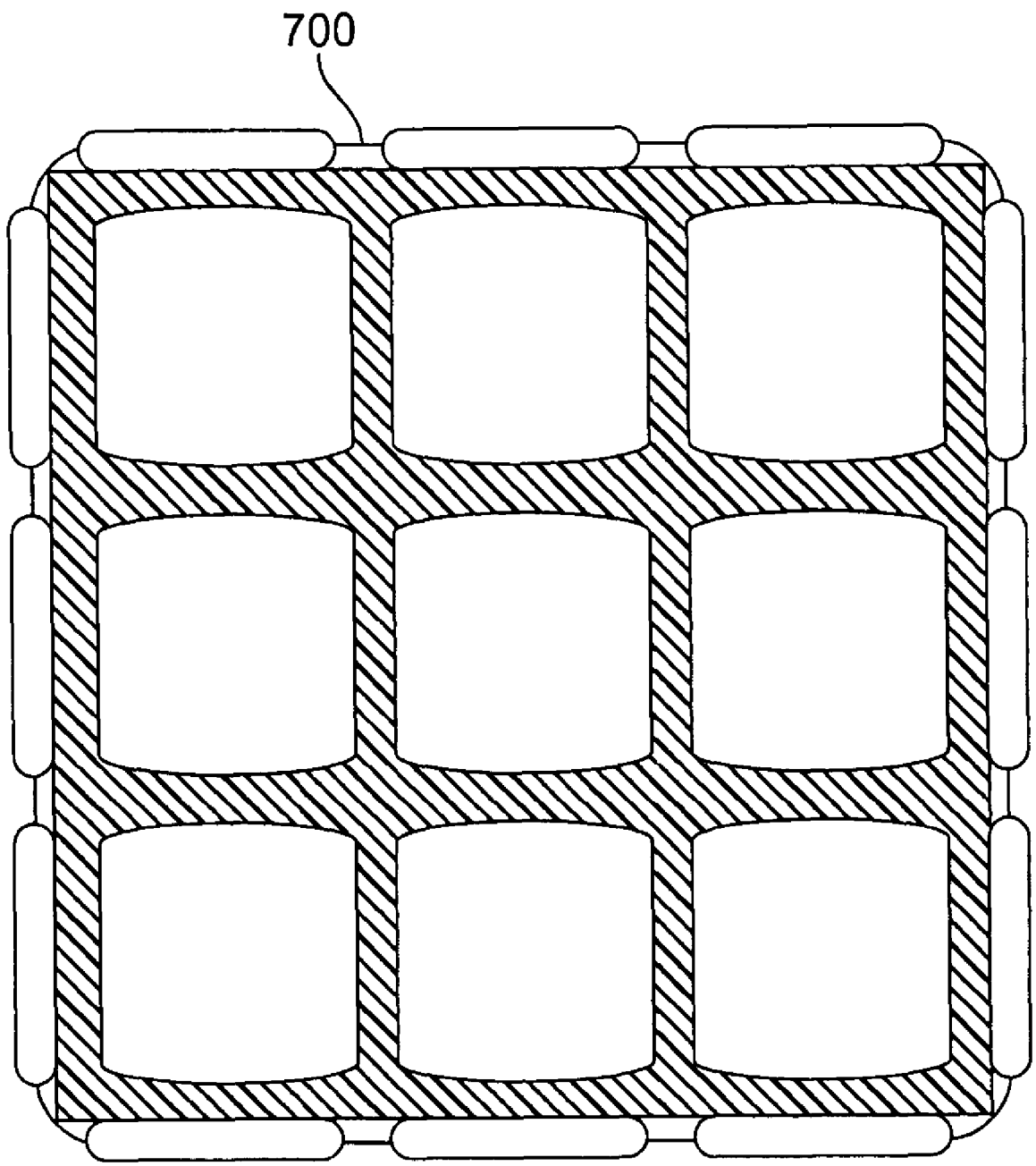
FIG. 7 is a perspective view of a thermal blanket according to one embodiment of the disclosure.

As shown in FIG. 7, in one embodiment, the thermal blanket can be wrapped around a payload. In this way, the blanket 700 may protect the specimen from shock and vibration even after the PCM has melted.

For a packaging system designed to hold 2°-8° C. for 48 hours, use of use of the thermal packages disclosed in the pack out versus frozen and refrigerated phase change materials and dunnage reduced the weight by 36.5% in a package that provided equivalent performance. The cost to ship the unit overnight may be significantly reduced.

Because the phase change material can be placed in direct contact with the temperature sensitive product, narrow temperature ranges can be held with less thermal mass and size. The end user's product is much easier to pack off correctly because it is less complicated. The final pack off does not require the specific placement of dunnage, bubble wrap, and gels as the current practice does.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus comprising:
   at least one container, the container substantially filled with a phase change material, wherein the phase change material is 1-decanol having a purity of about 90% to about 100%; and
   the apparatus being configured to maintain a specimen at about 2° C. to 8° C. during shipping,
   wherein the phase change material comprises about 98.7% 1-decanol, about 0.5% 1-octanol, about 0.09% moisture, a saponification value of about 0.17, a hydroxyl value of about 352.2 MG KOH/G, an iodine value of about 0.05, an APHA color of about 3, and acid value of about 0.02 MG KOH/G.

2. The apparatus of claim 1 wherein the phase change material and the container are configured to be reusable.

3. The apparatus of claim 1 further comprising a second container having a connector and a flexible lock configured to connect the first and second containers.

4. The apparatus of claim 1 further comprising a releasable lock coupled to the container.

5. The apparatus of claim 4 wherein a connector is coupled to the container.

6. The apparatus of claim 1 wherein the container is a blanket comprising nylon and polyethylene and wherein the blanket has cells substantially filled with the phase change material.

7. The apparatus of claim 6 wherein the 1-decanol has a purity of about 98%.

8. The apparatus of claim 6 wherein the phase change material comprises about 98% to 100% 1-decanol, a maximum of about 2% lauryl alcohol, a maximum of about 2% 1-octanol, a maximum of about 0.1% moisture, a maximum saponification value of about 0.5, a maximum hydroxyl value of about 356 MG KOH/G, iodine value of up to about 0.3, an APHA color of up to about 10, and acid value of up to about 0.10 MG KOH/G.

9. The apparatus of claim 6 wherein the polyethylene is low density polyethylene.

10. The apparatus of claim 6 wherein the nylon is 1 mil thick and the polyethylene is 3 mil thick.

11. The apparatus of claim 6 wherein the thermal blanket is configured to wrap around a payload.

12. An apparatus comprising:
at least one container, the container substantially filled with a phase change material, wherein the phase change material is 1-dodecanol having a purity of about 90% to about 100%; and
the apparatus being configured to maintain a specimen at about 20° C. to 24° C. over an extended period of time during shipping.

13. The apparatus of claim 12 wherein the container is substantially filled with 1-dodecanol having a purity of about 90%.

14. The apparatus of claim 12 wherein the phase change material and the container are configured to be reusable.

15. The apparatus of claim 12 further comprising a releasable lock coupled to the container.

16. The apparatus of claim 12 further comprising a second container having a connector and a flexible lock configured to connect the first and second containers.

17. The apparatus of claim 12 wherein the container is a blanket comprising nylon and polyethylene and wherein the blanket has cells substantially filled with the phase change material.

18. The apparatus of claim 17 wherein the phase change material comprises about 98.5% to 100% 1-dodecanol, a maximum of about 15 APHA color, maximum of about 0.10% $H_2O$ (Wt %), a maximum of about 100 ppm, and a hydroxyl number of between about 295 and 302 mg KOH/g.

19. The apparatus of claim 17 wherein the phase change material comprises a GC distribution of 98.2% 1-dodecanol (normal primary), 99.1% 1-dodecanol, for a total of 99.9% 1-dodecanol, about 10 APHA color, about 0.01% $H_2O$, about 16 ppm carbonyl, and a Hydroxyl Number of about 301 mg KOH/g.

20. The apparatus of claim 17 wherein the polyethylene is low density polyethylene.

21. The apparatus of claim 17 wherein the nylon is 1 mil thick and the polyethylene is 3 mil thick.

22. The apparatus of claim 17 wherein the blanket is configured to wrap around a payload.

23. A biological sample storage package comprising a blanket comprising nylon and low density polyethylene, wherein the blanket has cells substantially filled with 1-dodecanol having a purity of about 90% to about 100%, wherein the storage package is configured to maintain the biological sample at a constant temperature of about 20° C. to 24° C. during shipment.

24. A pharmaceutical shipping package comprising a blanket comprising nylon and low density polyethylene, wherein the blanket has cells substantially filled with 1-decanol having a purity of about 98%, wherein the package is configured to maintain a pharmaceutical product at a constant temperature of about 2° C. to 8° C. during shipment, wherein the phase change material comprises about 98.7% 1-decanol, about 0.5% 1-octanol, about 0.09% moisture, a saponification value of about 0.17, a hydroxyl value of about 352.2 MG KOH/G, an iodine value of about 0.05, an APHA color of about 3, and acid value of about 0.02 MG KOH/G.

25. An apparatus comprising:
at least one container, the container substantially filled with a phase change material, wherein the phase change material is 1-dodecanol having a purity of about 90% to about 100%; and
the apparatus being configured to maintain a specimen at about 20° C. to 24° C. over an extended period of time during shipping,
wherein the phase change material comprises a GC distribution of 98.2% 1-dodecanol (normal primary), 99.1% 1-dodecanol, for a total of 99.9% 1-dodecanol, about 10 APHA color, about 0.01% $H_2O$, about 16 ppm carbonyl, and a Hydroxyl Number of about 301 mg KOH/g.

* * * * *